Figure 3:
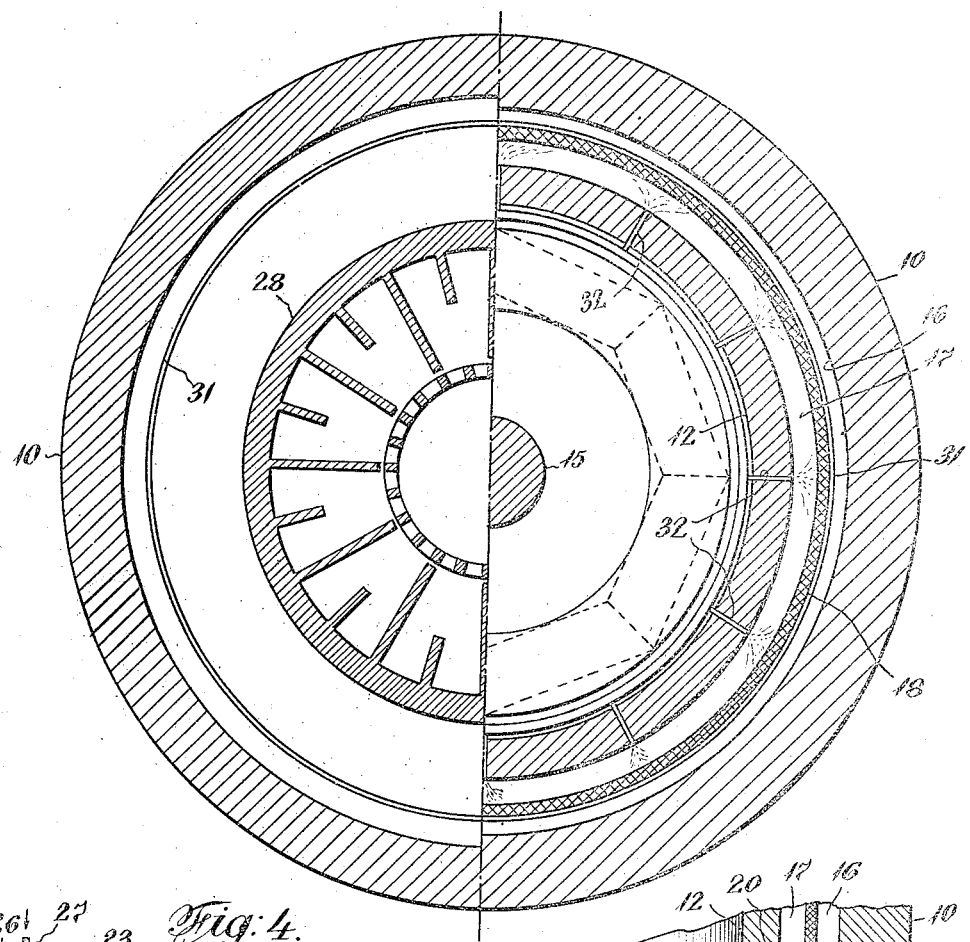

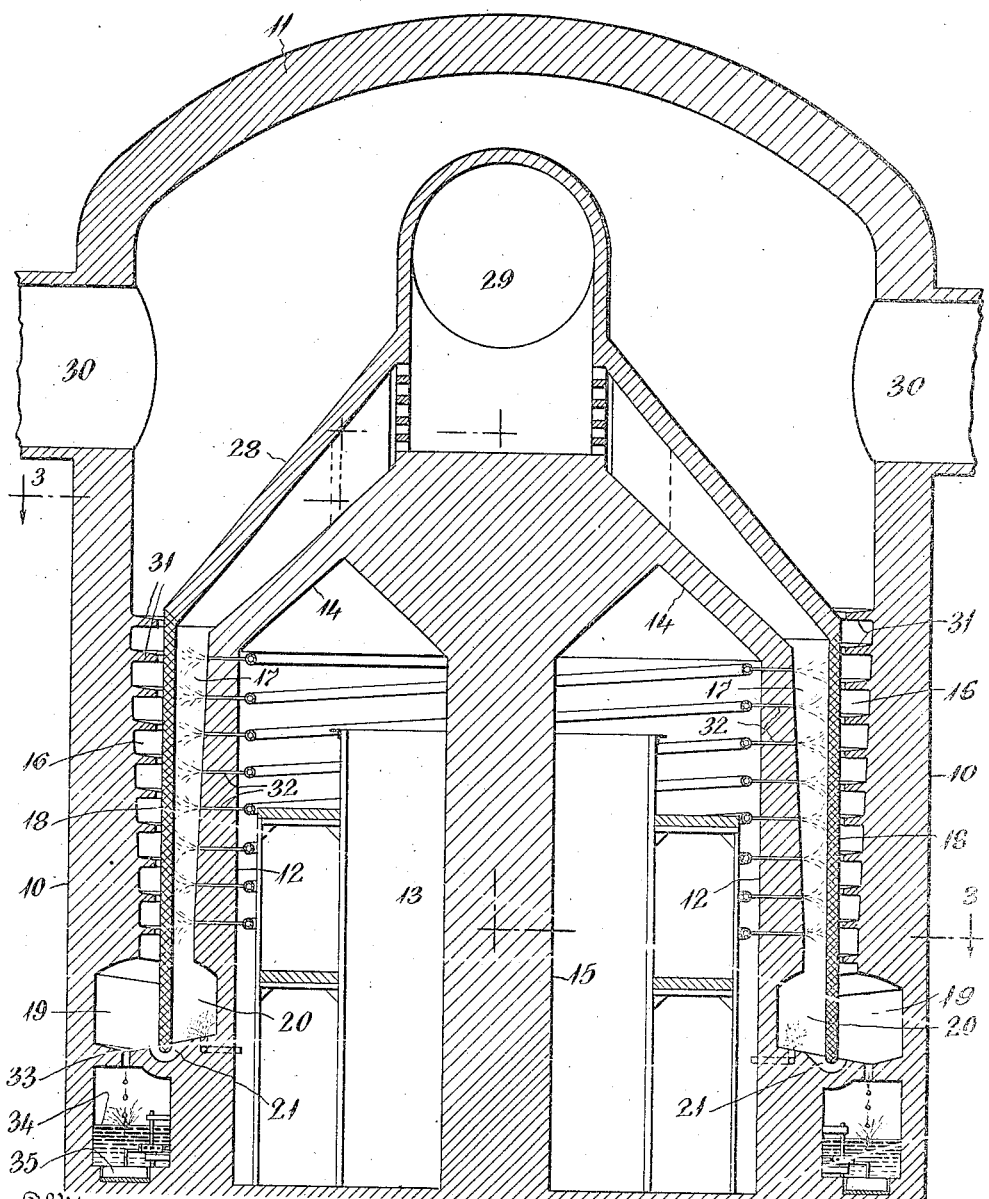

C. B. HILLHOUSE.
METHOD OF PRODUCING CARBON MONOXID FROM CARBON DIOXID.
APPLICATION FILED JUNE 29, 1915.
1,163,922.
Patented Dec. 14, 1915.
3 SHEETS—SHEET 2.
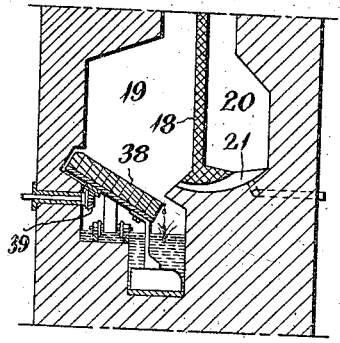
Fig: 5.
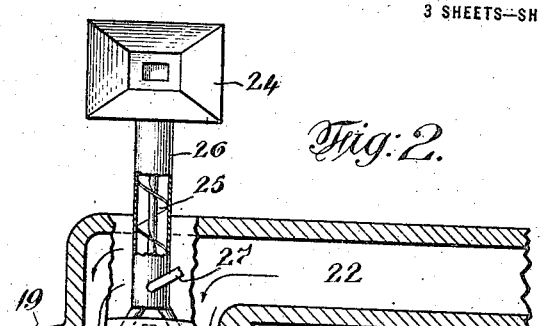
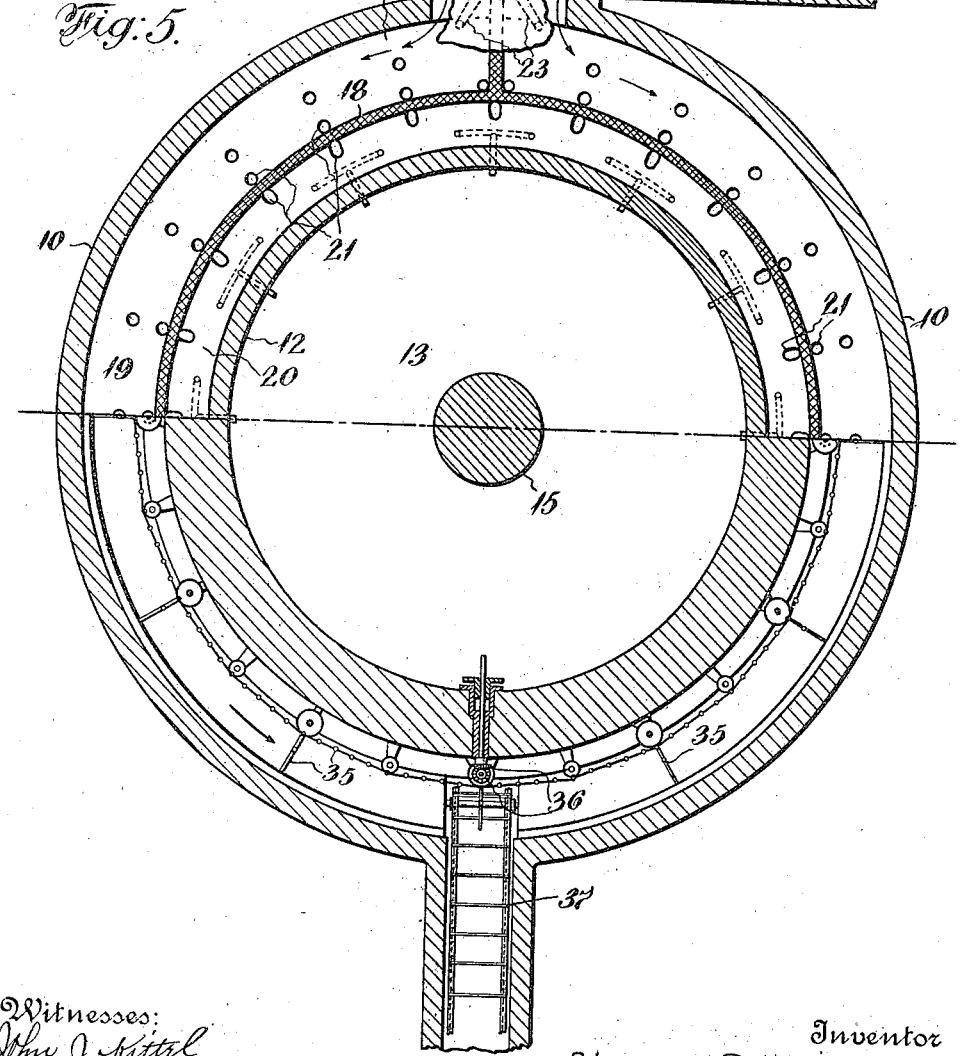
Witnesses:
John J. Kittel
L. F. Browning
Inventor
Charles B. Hillhouse
By his Attorney
Edward C. Davidson C. B. HILLHOUSE.
METHOD OF PRODUCING CARBON MONOXID FROM CARBON DIOXID.
APPLICATION FILED JUNE 29, 1915.

1,163,922.

Patented Dec. 14, 1915.

3 SHEETS—SHEET 3.

Witnesses:
John J. Kittel
L. F. Browning

Inventor
Charles B. Hillhouse
By his Attorney
Edward C. Davidson

UNITED STATES PATENT OFFICE.

CHARLES B. HILLHOUSE, OF NEW YORK, N. Y.

METHOD OF PRODUCING CARBON MONOXID FROM CARBON DIOXID.

1,163,922.  Specification of Letters Patent.  Patented Dec. 14, 1915.

Application filed June 29, 1915. Serial No. 36,949.

*To all whom it may concern:*

Be it known that I, CHARLES B. HILLHOUSE, a citizen of the United States of America, residing in the borough of Manhattan, city, county, and State of New York, have invented a certain new and useful Method of Producing Carbon Monoxid from Carbon Dioxid, of which the following is a specification.

This invention relates to the production of carbon monoxid (CO) gas and the controlling method embraces mixing powdered carbon and carbon dioxid ($CO_2$) gas under sufficiently high temperature to cause a carbon molecule to combine with one of the oxygen elements of the $CO_2$, resulting in 2CO. This method of converting $CO_2$ by carbon was broadly set forth in an application for Letters Patent filed by me July 3, 1913 under Serial Number 777,143 and was somewhat elaborated in the process and apparatus for treating ores forming the subject of an application for Letters Patent filed by me August 4, 1914 under Serial No. 856,727. This method is adapted to the treatment of pure, or substantially pure, $CO_2$ gas such as is obtained from limestone or as passes from ore reduction chambers, as for instance those of the apparatus of my before mentioned applications, and mixtures of $CO_2$ with other gases, of which one may be nitrogen where carbon or carbonaceous material is burnt, such as the gases of combustion from boilers, smelting and other industrial furnaces. The quantity of powdered carbon mixed with the $CO_2$ gas or gases a constituent of which is $CO_2$, will be sufficient to change in a suitable reaction chamber practically all of the $CO_2$ to CO, and the heat necessary to bring about such conversion may be wholly or partially provided by any suitable source. In cases where gases of combustion contain $CO_2$, nitrogen and CO before they reach their usual outlet, this process can be so adapted as to prevent the CO gas present from uselessly burning to $CO_2$ in the throat of the chimney as is usually the case, thereby adding to the percentage of CO gas produced without expenditure of additional heat. It is done by excluding the usual down currents of air in an outlet or chimney in connection with my process. The heat may be derived from an electric furnace, as in my application for Patent, Ser. No. 777,143 or from surface combustion furnaces, as in my application Ser. No. 856,727, or from burning as fuel a part of the CO gas generated in the reaction chamber, duly muffled, or from burning pulverized coal in a suitable combustion furnace duly muffled. It may also be partly supplied from the sensible heat of the $CO_2$ gas which emerges from reduction furnaces, or largely from the sensible heat of the nitrogen and other gases of mixtures including $CO_2$ gas resulting from burning fuel in any furnace the gaseous products of which it is desired to treat according to the method of this invention.

The powdered carbon may be mixed with the $CO_2$ gas before they enter the reaction chamber; the powdered carbon may be sprayed into a stream of $CO_2$ gas by inert gas or by $CO_2$, or CO and other gases, under pressure, and this spraying action may partake of a swirling character to fully insure a thorough admixture of the $CO_2$ and powdered carbon, or be sprayed by discharge from the container under centrifugal force or other means; or, the powdered carbon may be injected into quiescent $CO_2$ gas in the reaction chamber. The reaction chamber may be heated by gases, pulverized coal, surface combustion, electricity or any means capable of producing and maintaining sufficiently high temperature to bring about the desired conversion. The mixture of powdered carbon and $CO_2$ gas may be caused to flow through the heat zone of the reaction chamber in helical, up or down, or any suitable direction. Waste material in the powdered carbon or slag formed thereby may be discharged from the bottom of the heat zone of the reaction chamber.

As there is in all commercial carbon more or less residue or ash or what will form a slag under high temperatures, it is proposed to mix with the powdered carbon an amount of flux adequate to produce a readily fusible slag, the flux combining with the ash causing it to fuse at a lower temperature and so saving to a considerable extent in the applied heat. The quantity of flux supplied to the powdered carbon will vary with the amount and character of residue or waste, but whatever the source of the carbon may be only sufficient flux will be used to satisfy the slag to make it easily fusible and flow freely.

The reclamation of CO from $CO_2$ gas heretofore has been accomplished by passing the $CO_2$ gas over or through a mass of carbon (coke, coal or charcoal), the gas, carbon or both being adequately heated. In such processes large masses of carbon are used and maintained at high temperature to produce any considerable supply of CO gas because of the size of the lumps of carbon necessary to afford passage for the $CO_2$ gas through the mass of carbon, the surface areas of the lumps of carbon being comparatively small relative to such mass.

By the practice of the method of my present invention the carbon in powdered form affords enormous active surface of each particle of carbon compared with its bulk for action with the $CO_2$ gas, the carbon being quickly consumed and the process of producing CO may be continuous and large quantities of CO gas may be produced in a comparatively cheap and small apparatus. A suitable structure therefor is illustrated in the accompanying drawings, in which—

Figure 4:
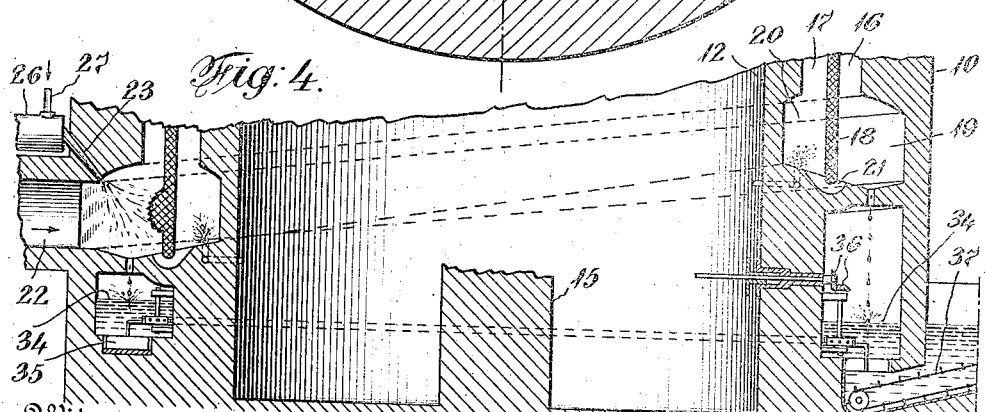

Figure 1 is a vertical sectional view of a reaction chamber: Fig. 2, a horizontal section taken at the lower part thereof: Fig. 3, a horizontal section on line 3, 3, Fig. 1: Fig. 4, a vertical section of the lower part of the structure at right angles to that shown in Fig. 1: and Fig. 5 shows a modification in the floor of the passage at the bottom of the heat zone.

The reaction device illustrated is a cylindrical structure having an outer wall 10, a dome 11, an inner wall 12 inclosing a central chamber 13, the conical roof 14 of which is partly supported by a central column 15. The heat zone 16 and combustion chamber 17 are contained between the outer and inner walls 10 and 12 and are separated by a partition 18 of highly refractory material as carborundum, brick or tiles. This partition also divides an annular passage located near the lower end of the device, into two parts, part 19 being below the heat zone 16 and part 20 below the combustion chamber 17. The lower edge of said partition 18 which may be of other material than carborundum, extends into a trough 21 and co-acts therewith as a trap seal between the heat zone and combustion chambers by said trough being filled with fluid slag, a residue of the fuel burnt in the combustion chamber to heat the heat zone to a high temperature through the refractory partition 18.

The $CO_2$ gas to be reduced to CO, whether it be substantially pure or mixed with other gases as before suggested, enters the part 19 of the annular passage beneath the heat zone 16 by the conduit 22, and in its passage thereto mixes with a stream of powdered carbon, to be thoroughly intermingled therewith, issuing from nozzles 23, which are so arranged as to direct the streams of powdered carbon in opposite directions around the passage 19, from this passage the mixed carbon and $CO_2$ gas pass upwardly through the heat zone 16, and to insure a better ascension through the heat zone the passage is inclined in both directions from the point where the gas and carbon enter to a point diametrically opposite thereto, as seen in Fig. 4.

The powdered carbon is fed from a hopper 24 by a screw 25 to the nozzles 23 which extend from the end of a pipe 26 in which the screw works, and at this end of pipe 26 is a pipe 27 in communication with the nozzles and with a source of compressed gas (which also may be sprayed in by centrifugal force) whereby the powdered carbon is sprayed into the inflowing $CO_2$ gas, being fed in definite quantity from the hopper 24 by the screw 25. The gas for spraying the carbon may be of an inert character or be $CO_2$ or a mixture of gases. The nozzles 23 may be adapted to impart a swirling action to the sprays of carbon. A conical roof 28 extends from the upper part of the carborundum partition 18 toward the center of the device where it terminates in flue 29 for the exit of the gaseous products of combustion of the heating fuel. The CO gas resulting from the action of the powdered carbon on the $CO_2$ gas passes from the chamber between the dome 11 and roof 28 by flues 30.

In the heat zone 16 narrow shelves 31 extend from the wall 10 to within short distances from the refractory partition 18, and these shelves are preferably inclined circumferentially or helically arranged, so that the $CO_2$ and carbon are caused to flow in contact with the partition 18, or in close proximity thereto and at the same time caused to flow upwardly in helical direction so they are adequately heated to bring about the conversion aimed at.

32 indicates pipes, nozzles or other suitable fuel supplying means. Said fuel may be of a gaseous character, as CO and air, the CO being a portion of that produced in the heat zone, or may be pulverized coal sprayed by air, or mixtures thereof. The residue of fuel if any will fall as fused slag into trough 21, be maintained in a fused condition therein and afford a seal between the heat zone and combustion chamber, as before described.

The excess of slag from trough 21 will flow down to the recess 33 formed in passage 19, as will also fall any residue or slag from the powdered carbon, and through holes therein fall into a well 34 in which is maintained a body of water. A circular acting scraper conveyer 35 located in the bottom of the well and actuated by suitable gearing 36 will convey the slag, etc., to an elevating conveyer 37, extending upwardly in a lateral passage from the well 34 and above the level of the water contained therein. The bottom of passage 19 may consist of a circular traveling plate 38 driven by suitable gearing 39. This will prevent accumulation of such carbon in one place as may fall from the nozzles 23. The heat zone is comparatively narrow, its width being such as to insure a maximum effective temperature in the most economical manner, and this width will be maintained in all of the sizes that the reaction chamber may be built. This applies also to the combustion zone. The combustion zone may be constructed so as to be on the outside or on the inside of the heat or reaction zone, but always duly muffled.

This process is preferably carried out in an apparatus from which air is excluded, for if nitrogen be present in the CO gas produced it may have an injurious effect in some operations in which said CO is used, as for instance in reducing iron ore for steel making, so as to exclude or to reduce the quantity of nitrogen in the resultant carbon monoxid gas (CO) to a minimum the carbon used in the reduction of the carbon dioxid ($CO_2$) may be stored and pulverized in an atmosphere of carbon dioxid gas ($CO_2$). This may be obtained from the source of $CO_2$ or elsewhere.

I claim:

1. The method of producing carbon monoxid (CO) from carbon dioxid ($CO_2$) which consists in mixing powdered carbon with the $CO_2$ and then heating the mixture to a reducing temperature.

2. The method of producing carbon monoxid (CO) from carbon dioxid ($CO_2$) which consists in mixing powdered carbon diffused and under motion with the $CO_2$, and then heating the mixture to a reducing temperature.

3. The method of producing CO from $CO_2$ which consists in spraying powdered carbon by means of a gas under pressure into a stream of $CO_2$ and heating the mixture to a reducing temperature.

4. The method of producing CO from $CO_2$ which consists in spraying powdered carbon under swirling motion by means of a gas under pressure into a stream of $CO_2$ and heating the mixture to a reducing temperature.

5. The method of producing carbon monoxid (CO) from carbon dioxid ($CO_2$) intermingled with other gases which consists in mixing powdered carbon with the gases including the CO, and then heating the mixture to a reducing temperature.

6. The method of producing CO from $CO_2$ which consists in spraying powdered carbon by means of a gas under pressure into a heated stream of gases including $CO_2$ and heating the mixture to a reducing temperature.

7. The method of producing carbon monoxid (CO) from carbon dioxid ($CO_2$) which consists in mixing powdered carbon with the $CO_2$, said mixture being caused to flow through a heat zone of sufficient intensity to raise it to a reducing temperature.

8. The method of producing carbon monoxid (CO) from carbon dioxid ($CO_2$) which consists in mixing powdered carbon with the $CO_2$, said mixture being caused to flow in helical direction through a heat zone of sufficient intensity to raise it to a reducing temperature.

9. The method of producing carbon monoxid (CO) from carbon dioxid ($CO_2$) which consists in mixing powdered carbon and flux with the $CO_2$ and then heating the mixture to a reducing temperature.

10. The method of producing carbon monoxid (CO) from carbon dioxid ($CO_2$) which consists in mixing powdered carbon with the $CO_2$ preheated and then raising the temperature of the mixture to bring about the reduction.

11. The method of producing CO from $CO_2$ which consists in spraying powdered carbon mixed with flux by means of a gas under pressure into a stream of $CO_2$ and then heating the mixture to a reducing temperature.

12. The method of producing carbon monoxid (CO) from carbon dioxid ($CO_2$) which consists in mixing powdered carbon and flux with the $CO_2$ then heating the mixture to a reducing and slag fusing temperature and allowing the slag to pass by gravity out of the resultant gas.

13. The method of producing carbon monoxid (CO) from carbon dioxid ($CO_2$) which consists in pulverizing and storing carbon in an atmosphere free of nitrogen, as $CO_2$ gas, mixing the powdered carbon with $CO_2$ gas in adequate combining proportions and then heating the mixture to a reducing temperature.

In testimony whereof, I have hereunto subscribed my name.

CHARLES B. HILLHOUSE.

Witnesses:
HOWARD G. MILNE,
JOHN C. BURKE.